Jan. 25, 1955  H. A. GOTTSCHALL  2,700,695
PLASTIC BATTERY CASE
Filed Dec. 10, 1953

*INVENTOR.*
HERBERT A. GOTTSCHALL
BY
*Harry M. Saragovitz*
ATTORNEY

# United States Patent Office 2,700,695
Patented Jan. 25, 1955

2,700,695

PLASTIC BATTERY CASE

Herbert A. Gottschall, Clifton, N. J., assignor to the United States of America as represented by the Secretary of the Army Application December 10, 1953, Serial No. 397,497

5 Claims. (Cl. 136—166)

(Granted under Title 35, U. S. Code (1952), sec. 266)

This invention relates to improved plastic battery cases and cell containers.

Plastic battery cases and cell containers made from various synthetic high polymers such as polystyrene, polyethylene, polyvinyl chloride, polyvinylidene chloride, or polymonochlorofluoroethylene or the like are well known in the art but their use has in the past been limited due to the relatively high vapor permeability of low cost plastics such as polystyrene or due to the high costs of plastics of relatively low vapor permeability such as polymonochlorofluoroethylene or the like.

It is an object of the invention to reduce the vapor permeability of plastic battery cases and cell containers without substantially complicating the manufacturing process and without considerably increasing the cost of the new battery case or cell container.

These and other objects of the invention will be achieved by the battery case according to the invention which consists of a dual wall of plastic materials. One of the walls of the new battery case comprises a thicker wall of a synthetic high polymer of relatively high vapor permeability and relatively low cost while the thinner wall comprises a synthetic high polymer of relatively low vapor permeability though of relatively higher costs.

The invention will become more apparent from the following description of specific embodiments of the broad inventive idea as illustrated in the three figures of the accompanying drawing.

Figure 1:
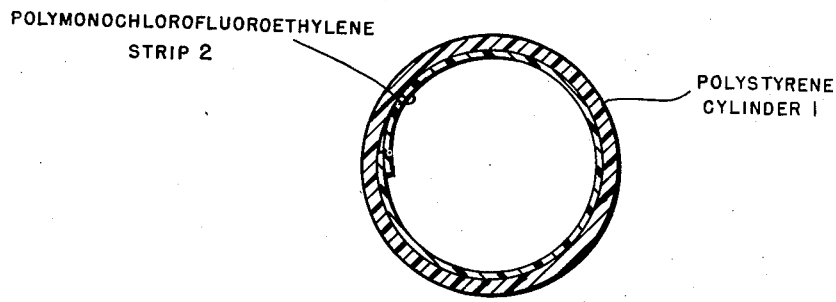

Fig. 1 shows in cross-section a cylinder 1 made from polystyrene or any other known modified polystyrene as used in the manufacture of cell cases and cut to the desired length of the battery case. Polymonochlorofluoroethylene sheeting 15 mils thick is then cut to strips of a width corresponding to the height of the polystyrene cylinders, e. g., 0.55 inch. The strips of polymonochlorofluoroethylene are then cut to such a length that when the strips are laid upon the inside surface of the polystyrene cylinders the strips overlap by about ⅛ of an inch. The overlap is now sealed with a cement (not shown in the drawing) made by dissolving polyvinylidene chloride in an appropriate solvent such as methyl ethyl ketone. The dual wall container is then allowed to dry for about 12 to 24 hours before being used to assemble a cell.

Other combinations of plastic materials of relatively low and relatively high vapor permeability are for instance: polyethylene liners with polystyrene, polyvinylidene chloride liners with polystyrene, polymonochlorofluoroethylene liners with polyvinyl chloride, polyvinyl chloride liners with polystyrene, etc.

Figure 2:
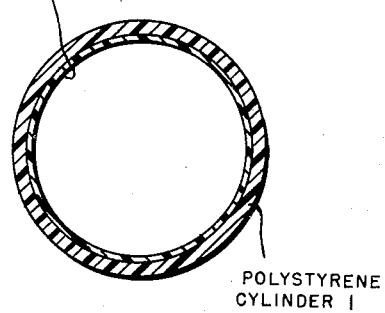

In the specific embodiment of Fig. 2 polystyrene cylinders 1 of 0.498 inches inner diameter and 0.625 inches outer diameter were machined on the inside so that a polymonochlorofluoroethylene tubing 3 (of 0.500 inches inner diameter and a wall thickness of 0.012 inches) could just be slipped inside the polystyrene cylinders. The assembled double cylinders were then immediately used for the manufacture of cell cases.

Figure 3:
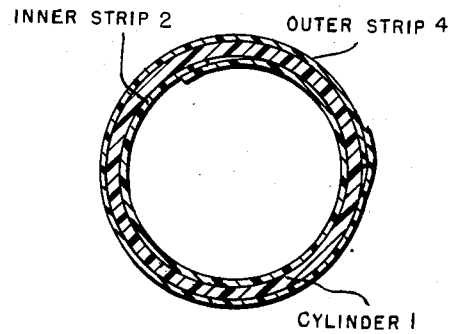

The plastic material of low vapor transmission can be positioned on the outside or the inside of the cylinder of high vapor transmission. In some cases it is advantageous to use 3 or more layers, as illustrated in Fig. 3 by making a cylinder 1 of plastic material of low vapor transmission the middle layer of a sandwich wall in which both the inner layer 2 and the outer layer 4 consist of plastic material of high vapor permeability.

Battery containers or cell containers according to the invention may be made commercially by multiple extrusion. The process of multiple extrusion and extruders capable of performing this operation are well known in the art.

Multiple wall cylinders according to the present invention are most suitable where a very thin layer of a comparatively expensive material of very low vapor transmission is used in combination with a less expensive material of a comparatively high vapor transmission.

It will be apparent to those skilled in the art that various changes or modifications of the disclosed embodiments may be made without departing from the inventive idea as characterized in the appended claims.

The invention described in the foregoing specification and claims may be manufactured and used by or for the Government for governmental purposes, without the payment to me of any royalty thereon.

What is claimed is:
1. Battery case and cell container consisting of a dual wall of plastic material comprising a thicker wall of a synthetic high polymer of relatively high vapor permeability and a thinner wall of a synthetic high polymer of relatively low vapor permeability.
2. Battery case and cell container according to claim 1 in which the thicker wall consists of polystyrene and the thinner wall of a member selected from the group consisting of polymonochlorofluoroethylene, polyvinylidene chloride, polyethylene and polyvinyl chloride.
3. Battery case and cell container according to claim 1 in which the thicker wall consists of polyvinyl chloride and the thinner wall of polymonochlorofluoroethylene.
4. Battery case and cell container comprising a thicker wall of a synthetic high polymer of relatively high vapor permeability sandwiched between thinner walls of a synthetic high polymer of relatively low vapor permeability.
5. Battery case and cell container comprising a cylinder of polystyrene lined with a thin film of polymonochlorofluoroethylene.

References Cited in the file of this patent

UNITED STATES PATENTS

| | | |
|---|---|---|
| 2,417,607 | Mowry | Mar. 18, 1947 |
| 2,578,518 | Ditz | Dec. 11, 1951 |